Jan. 4, 1927. 1,613,480
T. C. PORTER
CUTTING TOOL
Filed Jan. 23, 1925
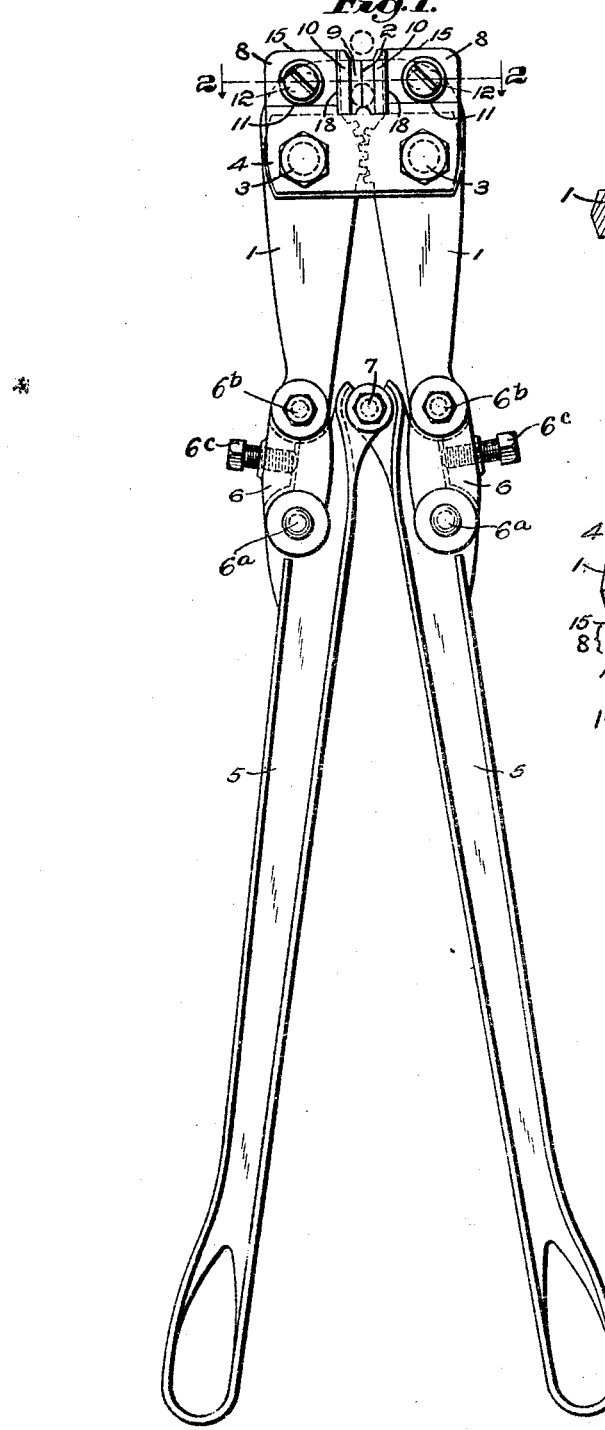
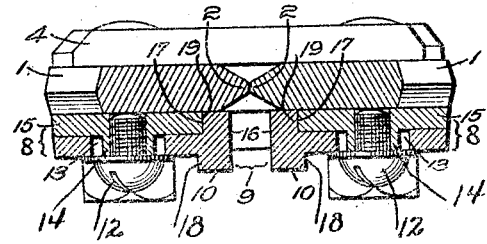
Inventor:
Tyler C. Porter,
by Emery, Booth, Janney & Varney.
Attys.

Patented Jan. 4, 1927.

1,613,480

UNITED STATES PATENT OFFICE.

TYLER C. PORTER, OF BROOKLINE, MASSACHUSETTS, ASSIGNOR TO H. K. PORTER, INC., OF EVERETT, MASSACHUSETTS, A CORPORATION OF MASSACHUSETTS.

CUTTING TOOL.

Application filed January 23, 1925. Serial No. 4,276.

This invention relates to cutting tools and more particularly to tools for cutting hardened bolts and other articles or case hardened links such as are used in tire chains.

The invention will best be understood by referring to the following description and accompanying drawings of one illustrative embodiment of the invention, wherein:

Fig. 1 is a side elevation of a cutting tool;

Fig. 2 is a transverse section through the cutting jaws and guard taken substantially on the line 2—2 of Fig. 1; and Fig. 3 is a fragmentary transverse section of a different form of cutting edge.

In the drawings I have shown a cutting tool embodying a pair of cutting jaw members 1 provided with blunt abutting cutting edges 2, which edges may be rounded (see Fig. 2) or otherwise formed as, for example, by the squaring off of the tapered edges as shown in Fig. 3. The effective opposed severing portions or surfaces of said edges are desirably disposed substantially symmetrical to a plane of movement common to both cutting jaws during the severing operations, and these faces are free from cutting edges such as are defined by the intersection of angular planes. By making the cutting edges blunt, say, for example, convexly curved on a radius approximating one-sixth of the diameter of work of capacity size, or one-sixth the thickness of the cutters, they may be very highly tempered, in fact substantially to a maximum degree of hardness possible without producing temper cracks and much higher than would be possible with a keen edge because of the tendency of the latter to chip when hardened or case hardened articles are attempted to be cut. When cooperating blunt or convex portions are used the bodies of metal composing the cutting edges will possess sufficient solidity to prevent chipping during the cutting of articles possessing even a greater degree of hardness than the edges themselves provided, however, that the hardening of the articles to be cut is merely a surface or case hardening, and not one that extends entirely therethrough. In the former case the operation is more in the nature of a crushing action than a cutting action.

Obviously the thicker the cutting edge the greater will be the power required for effecting the cutting operations. To this end I preferably employ cutter operating means such, for example, as of the types disclosed in Patents Nos. 484,670; 720,835; 830,453 and 862,279, although it should be understood that the invention is not limited to these types.

Briefly the cutter operating means of said patents and as illustrated herein include jaws 1 arranged to swing about pivots preferably separated from each other and constituting bolts 3 which extend through and connect together opposite ends of straps 4 lying against opposite faces of said jaws. The tails of the cutting jaws 1 are pivotally connected with operating levers or handles 5 preferably through links 6 each of which latter is pivoted at 6ª to the handle 5 and at 6ᵇ to the tail of its jaw 1. The operating handles 5 are desirably pivotally united by a stud 7 which normally lies substantially between the tails of said jaws 1 and in such a relation as to effect a powerful toggle-like action through the links 6 upon said jaws when the handles 5 are operated. The links 6 are each provided with an adjustable abutment herein in the form of a screw 6ᶜ adjustable in said link so as normally to bear against the edge of its respective handle lever 5 as illustrated and impart the exact amount of movement to the cutting jaw necessary to bring two cutting edges together and to take up for wear on the joints of said levers and on said cutting edges.

Preferably the cutting edges 2 of the jaws are made relatively short, particularly when used to cut hardened material such as tire chains so as to prevent the overloading of the tool. In this case said edges will be only long enough to receive one side of a link, the wire of which is of the maximum size capable of being cut by the tool. Oftentimes the cutting jaws are capable of being opened much wider than is necessary to admit work of a capacity diameter and, to prevent the insertion of oversize work, I herein provide a guard 8. This guard is desirably placed close up to one face at least of the cutters and has a throat 9 of the desired width disposed symmetrically with respect to the meeting or abutting line of the cutting edges. In the present example the guard 8 is arranged against one face of the jaws and fitted over the strap 4 at that side. The pivotal screws 3 for the jaws 1 may be and preferably are used to retain said guard in operative position.

Owing to variations in hardness and in the shapes of the work to be cut the throat 9 may be wider in proportion to the movement of the cutting edges at certain times as when the material is soft, than when it is hard. In view of such variations guard throats of different sizes may be required and when such is the case, the guard 8 may be replaced by one having the desired width of throat. Preferably, however, I have provided a guard having adjustable side members 10 mounted to slide toward and away from each other along guides 11 formed upon the body of said guard 8. Means are also provided for securing said members in adjusted relation, said means herein including screws 12 extending through slots 13 in said side members and into screw-threaded engagement with lugs 14 projecting forwardly from upstanding portions 15 of said guard and into their respective slots 13.

With the foregoing arrangement, the side members of the guard throat may be moved and secured in substantially any of their intermediate positions and the opposite side members may be at different distances from the abutting plane of the cutting edges so as to compensate for irregularities in shape of the work. For all ordinary purposes, however, it is desirable to maintain the work engaging faces 16 of said side members equidistant from the aforesaid plane and, to this end, said work engaging portions are made substantially wider than their bodies to form shoulders 17 and 18 adjacent opposite faces of said bodies. The shoulders 17 are equally distant from their work faces 16 but this distance desirably differs from the distance of the shoulders 18 from said work faces whereby a plurality of steps, herein two, are provided for engaging the inner edges 19 of the upstanding members 15.

When a wide throat is required, the movable side members 10 may be placed with their shoulders 17 abutting the edges 19 of said guard and positively prevent spreading of said members. To provide a narrower throat, the positions of the side members may be reversed so as to bring the shoulders 18 in abutting relation with said edges 19 and thereby also provide a narrow throat with rigid sides when such is desired, the screws 12 serving in the last two instances merely to prevent inadvertent displacement or movement of said side members.

Although I have disclosed and discussed in detail one full and complete embodiment of my invention for illustrative purposes only, it is to be understood that the invention is not limited thereto.

Claims.

1. A metal severing tool comprising cooperating jaws provided with opposed blunt operative edges abutting one with another in face to face contact and cooperating operating levers united with said jaws to form toggles for actuating said jaws.

2. In a metal severing tool, cooperating jaws provided with opposed blunt operative edges abutting one with another in face to face contact, the contacting portions thereof being free of cutting edges such as are defined by the intersection of angular planes.

3. In a metal severing tool, cooperating jaws having operating edges hardened to an abnormally high degree and possessing a substantially uniform degree of hardness throughout, the effective severing portions of said edges being defined by opposed surfaces, as distinguished from a line, arranged for face to face contact.

4. A cutting tool comprising cooperating cutting jaws provided with convex operative edges arranged to abut one with another in face to face contact, the thickness of said cutting edges being approximately one-sixth the thickness of said cutting jaws.

5. In a metal severing tool, cooperating jaws having opposed operative edges constituting surfaces arranged for face to face contact, and means to prevent the insertion between said jaws of work above a predetermined size.

6. A tool for severing hardened metals including cooperating cutting jaws provided with blunt abutting edges, the effective severing portions of said abutting edges being disposed substantially symmetrical to a plane of movement of the cutting jaws during the severing operation, and having their contacting portions free from edges such as are defined by the intersection of angular planes.

7. In a cutting tool, cooperating swinging jaws, removable cooperating members for forming a throat of selected widths symmetrically to register with the abutting plane of the edges of said jaws and shoulders on said co-operating members to rigidly maintain the co-operating edges of said members at a plurality of positions equidistant from said abutting plane.

In testimony whereof, I have signed my name to this specification.

TYLER C. PORTER.